Nov. 1, 1932.   L. J. JOHNSON   1,886,191
SHOCK ABSORBING DEVICE FOR OUTBOARD MOTOR DRIVES
Filed April 4, 1928   2 Sheets-Sheet 2

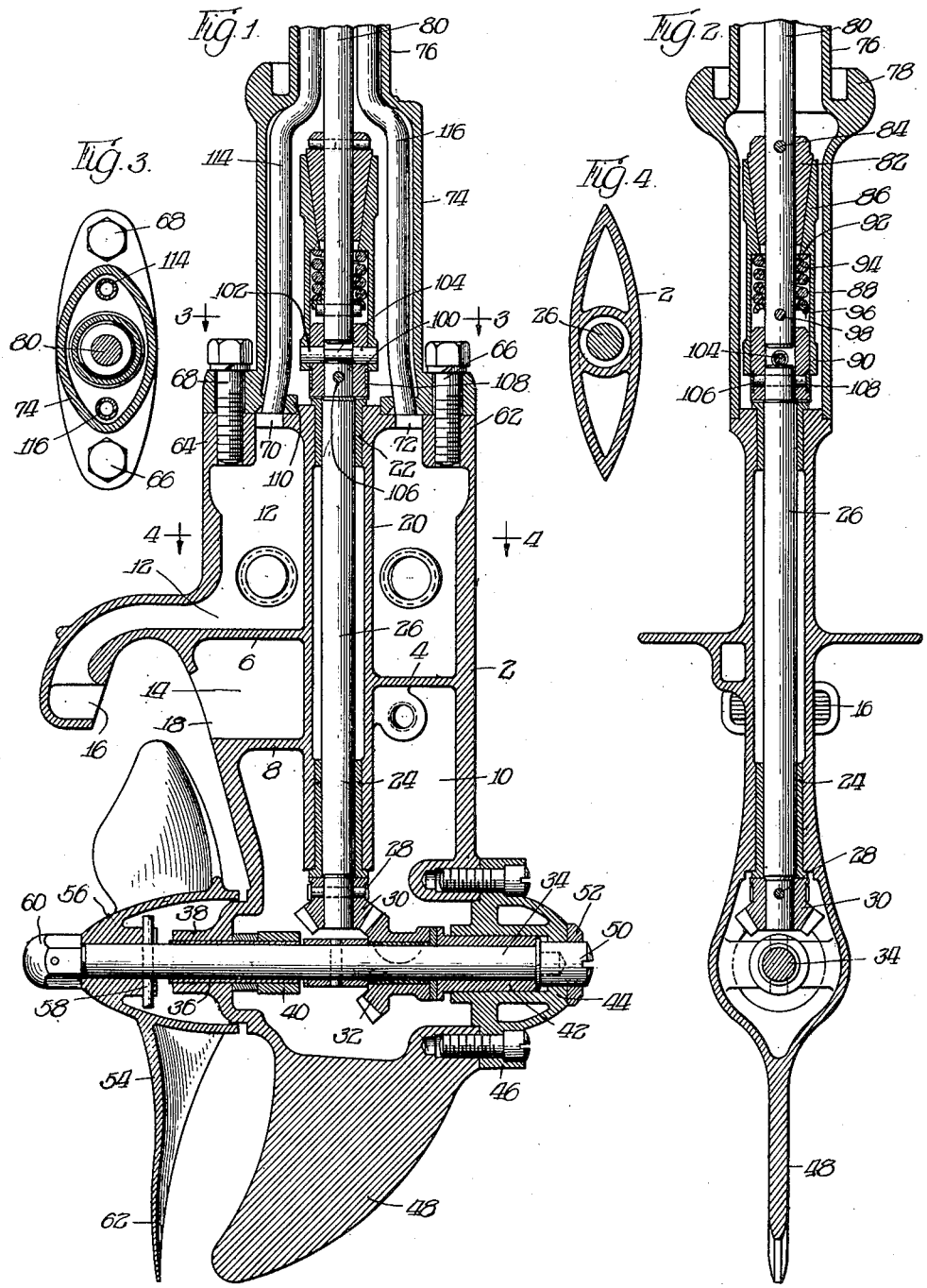

Inventor:
Louis J. Johnson,
By Cheever & Cox
Attys

Patented Nov. 1, 1932

1,886,191

UNITED STATES PATENT OFFICE

LOUIS J. JOHNSON, OF SOUTH BEND, INDIANA, ASSIGNOR TO JOHNSON BROTHERS ENGINEERING CORPORATION, OF SOUTH BEND, INDIANA, A CORPORATION OF INDIANA

SHOCK ABSORBING DEVICE FOR OUTBOARD MOTOR DRIVES

Application filed April 4, 1928. Serial No. 267,274.

My invention relates to outboard motors and more in particular to the construction of a shock absorbing mechanism or slip clutch arranged to prevent damage or breakage of the propeller and stripping of the gear drives between the engine shaft and the gear shaft due to the propeller striking some object when rapidly revolving. One of the objects of my invention is to provide an arrangement whereby the shock absorbing device or a slip clutch is located directly in the substantially vertically disposed engine driven shaft at a location preferably above the submerged gear housing whereby the assembly, repair, and replacement of the slip clutch is facilitated and whereby all danger of the clutch becoming impaired due to presence of sand, sediment, or hard objects entering the gear case is eliminated.

Still another object of my invention resides in the construction and arrangement of the shock absorbing device or slip clutch in the substantially vertically disposed drive shaft which connects to the propeller shaft and disposed in that section of the housing which is mounted upon the top of the substantially streamline gear housing and in a manner so as to provide for the quick attachment and detachment of these housings and the members of the slip clutch and drive shaft and at the same time to provide room for the disposition of the water conduit pipes leading from the water jacket of the motor to the under-water discharge and exhaust, all of said parts being wholly encased in a housing which approaches in cross section the streamline contour of the lower gear housing. An ancillary object of this aspect of my invention resides in the construction of an upper casing adapted to house the centrally located slip clutch concentrically arranged about the vertically disposed engine driven shaft and the arrangement of water connecting pipes on each side of said slip clutch whereby the conduction of the water circulating to and from the water jacket of the engine is formed in a compact and convenient and quick assembled structure.

These and other objects of my invention will be apparent from a perusal of the following specification when taken in connection with the accompanying drawings wherein:

Figure 1 is a side sectional view of the preferred construction for my present invention;

Figure 2 is a rear sectional view thereof;

Figure 3 is a section on line 3—3 of Figure 1;

Figure 4 is a section on line 4—4 of Figure 1;

Figure 5:
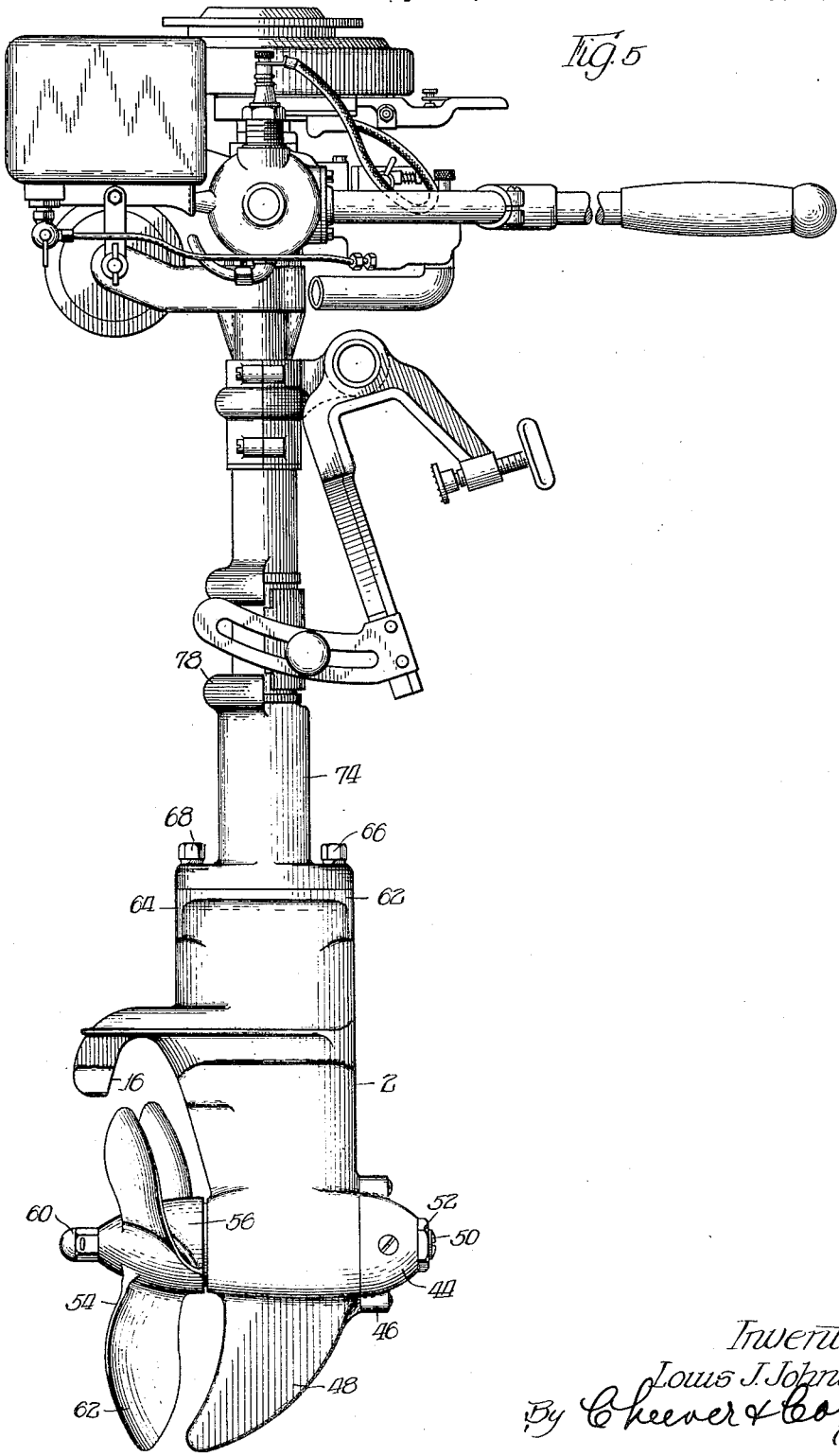
Figure 5 is a perspective view of an outboard motor assembly including my invention.

Referring now to the drawings in detail, my preferred invention comprises a gear casing 2 preferably of light metal such as aluminum or aluminum alloy which casing as indicated in Figure 4 is of such cross sectional shape as to permit it to move through the water with minimum resistance. In cross section the casing is preferably either streamline in contour or substantially streamline. In some instances I prefer to make this lower structure of the well-known streamline construction wherein the front portion is substantially blunt and the trailing portion is substantially knife edge or I may make the casing of symmetrical knife edge construction as shown in Figure 4. This housing is hollow to provide water circulating chambers and lubricant chambers. It is provided with internal partitions 4, 6, and 8 to provide a lower lubricating chamber 10, a water inlet chamber 12 and a water discharge chamber 14. The water inlet chamber 12 is provided with an inlet mouth 16 and the discharge chamber is provided with a discharge mouth 18 which mouths are in position to cooperate with the propeller blades of the propeller as hereinafter described. In addition, the housing is provided with a substantially vertically disposed tubular wall 20 adapted to receive an upper bearing 22 and a lower bearing 24, both in the form of sleeves and which sleeves receive the central or substantially vertical motor driven shaft 26 having bearings therein. This shaft has pinned at its lower end as at 28 the bevel gear 30 which gear meshes with another gear 32 mounted on the propeller drive shaft 34 which is disposed at right angle position relative to the drive shaft 26. This propeller drive shaft 34 has a rear bearing in a sleeve 36 mounted in a tubular extension 38 at the rear of the housing 2 and an intermediate sleeve 40 within the housing 2. The front of the shaft 34 has a bearing in a sleeve 42 carried by a gear case head 44 bolted by means of bolts 46 to the front of the housing. The bottom of the housing has the usual skeg 48. The front of the gear case 44 is closed by means of a threaded plug 50 held by means of a lock nut 52. The propeller 54 has its hub 56 fixed to shaft 34 by means of a shear pin 58 and the rear end of the shaft has a nut 60 threaded thereon to close the opening in the hub of the propeller. The propeller blades 62 of the propeller are arranged to revolve and in revolution pass between the mouths 16 and 18 forming the inlet and discharge for the water circulating system respectively so that when the propeller revolves, water will be forced into the opening 16 and will be sucked from the discharge opening 18 as is described and claimed in one of my former patents.

The top of the housing 2 is provided with inwardly extending lugs 62 and 64 which are perforated to receive bolts 66 and 68 and the upper portion of the housing 2 is provided with a water inlet port 70 and a water discharge port 72. An upper housing or section 74 is adapted to be attached to the top of the housing 2 by means of the bolts 66 and 68. This upper housing, as shown in section in Figure 3, is in cross section and approaches, or substantially approaches the streamline or knife edge contour shown in Figure 4, being somewhat oval in shape with bluntly pointed ends. This housing or upper section 74 extends upwardly and merges to a portion which gradually or progressively changes into circular cross section as shown at 76. This upper section carries one of the locking collars 78 of the means for locking the housing from tilting when the housing is turned into reversed position which corresponds to a position where the engine is driven rearwardly by the propeller, all as shown in my prior Patent #1,467,641, of September 11, 1923 and which collar herein designated as 78 corresponds to the same metal shaped flanges 23 of such prior patent. Whereas in my present construction this upper section 74 and the rigidly connected housing 2 are adapted to be turned either somewhat for steering or completely in a circle for reversing the position of the propeller for driving the boat in the opposite direction, I desire it to be understood that my present construction likewise is applicable to a housing and upper section forming a shaft and a water conduit enclosing section which does not turn.

The structure wherein the arrangement is turnable is clearly shown in my aforementioned Patent #1,467,641, and also in Figure 5 of the drawings.

In my present invention the vertically disposed drive shaft 26 is arranged to be driven from the engine of the outboard motor which as is shown in Figure 5 and as is shown in my prior patent above mentioned, is mounted at the top of the structure shown in Figure 1 of the drawings. My present invention is concerned with the arrangement and disposition of a shock absorbing device or specifically, a slip clutch in the driving train between the motor driven shaft 80 and the substantially vertically disposed drive shaft 26 and I preferably locate this slip clutch and mount it directly within the upper and removable housing or section 74. By disposing the slip clutch at this upper point, with relation to the propeller and that part of the housing containing the bevel gears 28 and 30 and the lubricant containing chamber 10, I entirely eliminate any danger of sand or sediment or any hard objects coming in contact with the members of the slip clutch and thereby eliminate any danger of the clutch sticking.

In my present construction, the slip clutch comprises two substantially frustro-conical or circular sleeves which are wedge shaped in cross section. The inner clutch member 82 is pinned as at 84 to shaft 80 and the outer clutch member 86 which surrounds the lower portion of the inner clutch member 82 is provided with a sleeve like extension 88 which is tubular in form and extends downwardly as at 90 to a point well toward the bottom of the section 74. This sleeve like extension is provided with a shoulder 92 against which the upper end of the coil spring 94 rests. The lower end of the coil spring is held in compressed position by means of a collar 96 pinned to the upper shaft 80 by means of pin 98 so that the spring serves to force the inclined inner surface of the outer clutch sleeve 86 against the correspondingly inclined face of the inner clutch sleeve 82 whereby to compel the clutch normally to function. The upper end of the substantially vertically disposed shaft 26 passes through the sleeve bearing 22 and is fitted within the bore of a plug 100. This plug 100 has a transversely extending bore within which fits a pin 102 having a central portion 104 of reduced cross section forming a circumferential recess adapted to receive the upper end of the shaft 26 whereby the pin is locked from transverse movement. This pin passes through registering bores in the plug 100 in the lower end of the sleeve extension 90 thereby serving to lock the plug and sleeve together while the upper end of shaft 26 locks the pin from endwise displacement. In addition, a second pin 106 passes through the upper end of shaft 26 and through the lower end of plug 100 and is held from endwise movement by encircling resilient ring 108. The lower end of shaft 80 telescopically fits within the upper end of the vertical bore passing through the plug 100.

The lower portion of the upper section 74 is provided with inwardly extending flanges 110 and 112 providing seats for two water carrying tubes 114 and 116 respectively. The lower or open mouths of these tubes are in registration with the ports 70 and 72 leading from the water inlet into the water discharge portions of the lower casing structure 2. These pipes 114 and 116 extend upwardly on each side of the slip clutch mechanism and about the centrally disposed drive shaft 80. At the upper ends these pipes curve inwardly and extend in parallel relation about the shaft 80, passing through the tubular extension 76 in snug relation and connecting with the inlet and discharge of the water jacket of the motor.

It will thus be seen that I have provided a detachable upper section 74 which is detachably connected to the top of the substantially streamline gear case and I have provided this upper section of the housing so that it encloses the slip clutch and the water circulating pipes which connect the water jacket with the underwater inlet and discharge. At this location, the slip clutch is very accessible for assembly, detachment, and repairs. It is also in position where it is normally out of water and is thus free from the injurious influences particularly of salt water. By arranging this upper casing in a cross section that approaches the substantially streamline contour of the lower gear housing, it very nicely accommodates the disposition of the central vertically disposed motor driven shaft, the concentrically surrounding slip clutch members and the two water conducting pipes to the water jacket of the ending and at the same time affords a substantial and protective housing so that the water circulating system is at all times enclosed and protected from the water and particularly the lower portion of the water circulating system is confined within a streamline housing even to a point well above the normal water level.

It will be apparent that in the operation of my device that if the propeller strikes a snag or solid object or the like, when the motor is running, the slip clutch will yield against the tension of the coil spring so that the propeller will not be injured. It will also be apparent that in my construction, if by any possibility the slip clutch members should stick, the shear pin 58 will break but the shear pin will not break unless the clutch sticks because the tension of the spring is arranged to give way before the sheer pin can possibly break. Hence I have provided a shock absorbing means normally to prevent the breakage of the shear pin and I have provided a shear pin which will break upon the sticking of the clutch so as to prevent any possible injury to the propeller.

Having thus described my invention, what I claim as new and desire to secure by Letters Patent is:

1. In an outboard motor assembly, the combination of a detachable submersible gear housing, a propeller carrying shaft mounted in the lower portion of said housing, a propeller on said shaft, a vertically disposed shaft mounted in said housing, gearing connections between said two shafts, an engine driven shaft and a slip clutch connection disposed at the upper end of said detachable housing and connecting said engine driven shaft and the vertically disposed shaft.

2. In an outboard motor assembly, the combination of a submersible gear case carrying a propeller shaft, a propeller on said shaft, an angularly disposed shaft mounted in said housing and geared to said propeller shaft, an upper housing detachably connected to said submersible housing at its top, an engine driven shaft mounted in said upper housing and a slip clutch also mounted in said upper housing and connecting the engine driven shaft with the shaft mounted in said submersible housing.

3. In an outboard motor assembly, the combination with an outboard motor having a depending drive shaft, a tubular support surrounding said drive shaft, said tubular support terminating in a coupling member, a propeller carrying housing having a corresponding coupling member, means for coupling said coupling members, a drive shaft passing through said tubular support, an angularly disposed propeller carrying shaft mounted in the lower portion of said housing, a propeller on said shaft, geared connections between said propeller carrying shaft and the vertically disposed shaft in said housing, and a slip clutch disposed in said tubular housing and connecting the engine shaft with the shaft enclosed in said propeller carrying housing.

4. In an outboard motor assembly, the combination of a motor having a depending drive shaft, a tubular casing connected therewith, means for turning said tubular casing, a gear case detachably connected to the lower end of said tubular casing, a propeller shaft mounted in the lower portion of said gear case, a propeller on said shaft, a third drive shaft mounted in said gear case and geared connection between said propeller shaft and said third drive shaft, and a slip clutch connection between the engine shaft and said third drive shaft.

5. In an outboard motor construction, the combination of a motor having a depending drive shaft and an enclosing tubular casing, a separable gear case attached to the base of said tubular casing, a propeller shaft mounted in the lower portion of said gear case and a propeller on said shaft, a third shaft vertically disposed in said gear case, gearing connections between said propeller shaft and said third shaft and a slip clutch mounted in the lower portion of said tubular casing and connecting the engine shaft and said third shaft.

6. In an outboard motor assembly, the combination with a motor having a depending drive shaft and an enclosing tubular casing carrying at its lower end a separable gear case extending above the normal water level, a propeller shaft mounted in the lower portion of said casing, a propeller on said shaft, a third shaft mounted in said gear case and geared to said propeller shaft, and a slip clutch enclosed in one of said casings and connecting the engine shaft with said third shaft, said slip clutch being disposed above the normal water level.

7. In an outboard motor assembly, the combination with a motor having a depending drive shaft and an enclosing tubular casing carying at its lower end a gear case extending above the normal water level, a propeller shaft mounted in the lower portion of said casing, a propeller on said shaft, a third shaft mounted in said gear case and geared to said propeller shaft, and a slip clutch enclosed in one of said casings and connecting the engine shaft with said third shaft, said slip clutch being disposed above the normal water level, and water conduits extending from openings on the gear case below the water level upwardly through said gear case and through said tubular casing and connecting with the water jacket of the engine.

8. In an outboard motor assembly, the combination with a motor having a depending drive shaft and an enclosing tubular casing carying at its lower end a gear case extending above the normal water level, a propeller shaft mounted in the lower portion of said casing, a propeller on said shaft, a third shaft mounted in said gear case and geared to said propeller shaft, and a slip clutch enclosed in one of said casings and connecting the engine shaft with said third shaft, said slip clutch being disposed above the normal water level, and water conduits extending from openings on the gear case below the water level upwardly through said gear case and through said tubular casing and connecting with the water jacket of the engine, said water conduits extending on opposite sides of the slip clutch.

9. In an outboard motor assembly, the combination with the motor having a depending drive shaft, a hollow casing surrounding said drive shaft and terminating in a submersible portion, a propeller carrying shaft mounted in the lower portion of said casing, a propeller on said shaft, a sectional engine shaft disposed in said casing and geared to said propeller shaft, a slip clutch connecting said engine shaft with said sectional shaft comprising engaging friction members and means adapted to secure one of said friction members to its shaft section, said means being in turn fixed against displacement by interlocking with its shaft section.

10. In an outboard motor, the combination with the motor having a depending drive shaft, a hollow casing surrounding said depending drive shaft and having a portion adapted to extend below the normal water level and being of substantially streamline contour to a point above the normal water level, a propeller shaft carried by the lower portion of said casing, a propeller on said shaft, an engine shaft on said casing and geared to said propeller shaft, a clutch cone carried by one of said shafts, a clutch sleeve surrounding the clutch cone and slidably mounted on one of said shafts, the adjacent ends of the shafts being spaced apart, spring means for normally moving the clutch sleeve towards the cone, a pin extending through said sleeve, a member secured to the other shaft section and connected to the sleeve by said pin, said pin being provided with a centrally disposed reduced portion in which the end of one of the shaft sections is disposed and forming means whereby axial displacement of the pin is prevented.

11. In an outboard motor assembly, the combination with the motor having a depending drive shaft, a tubular casing surrounding said drive shaft, and terminating at its lower end in a rigidly and detachably connected gear housing, a second shaft in said gear case in line with the engine shaft, a propeller shaft mounted in the lower portion of said gear casing, a propeller on said shaft, gearing connections between said propeller shaft and said second named shaft, and a slip clutch in said tubular casing and arranged to connect the engine shaft with said second named shaft.

12. In an outboard motor assembly, the combination of a motor having depending drive shaft, a substantially circular tubular casing surrounding said engine shaft, a gear casing rigidly and detachably carried by the lower end of said tubular casing, a propeller shaft carried at the lower end of said gear casing, a propeller on said shaft, a substantially vertically disposed shaft in said gear casing having gear connection with the propeller shaft, and a slip clutch mounted in the tubular casing, said slip clutch connecting the engine shaft with the vertically disposed shaft.

13. In a device of the class described, the combination with a motor and its depending drive shaft, a tubular casing surrounding said drive shaft and of substantially larger diameter than the drive shaft to provide room for water circulating conduits, said tubular casing terminating at its lower end in a portion of increased cross section of somewhat oval contour, a gear casing having a knife edge or a substantially streamline contour extending to its top, means for attaching the gear casing to the lower end of the tubular casing, a substantially vertically disposed shaft fastened through the gear casing, a propeller shaft mounted in the lower portion of said gear casing, geared connections between said propeller shaft and said second named shaft, a propeller on said shaft, a slip clutch disposed in the lower portion of said tubular casing which is of enlarged diameter, the lower portion of said tubular casing having an opening therein of sufficient cross section to permit the passage of the slip clutch therethrough.

14. In a device of the class described, the combination with the motor and its depending drive shaft, a tubular casing surrounding said drive shaft and of substantially larger diameter than the drive shaft to provide room for water circulating conduits, said tubular casing terminating at its lower end in a portion of increased cross section of somewhat oval contour, a gear casing having a knife edge or a substantially streamline contour extending to its top, means for attaching the gear casing to the lower end of the tubular casing, a substantially vertically disposed shaft fastened through the gear casing, a propeller shaft mounted in the lower portion of said gear casing, geared connections between said propeller shaft and said second named shaft, a propeller on said shaft, a slip clutch disposed in the lower portion of said tubular casing which is of enlarged diameter, the lower portion of said tubular casing having an opening therein of sufficient cross section to permit the passage of the slip clutch therethrough, and water circulating pipes disposed on diametrically opposite sides of the vertically disposed shaft and passing from a point on the gear casing below the normal water level upwardly through the gear casing and through the tubular casing and connecting with the water jacket of the engine.

15. In an outboard motor assembly, a depending drive-shaft, a tubular casing surrounding the driveshaft, a gear casing connected to the tubular casing having water chambers therein, a slip clutch for the shaft in the tubular casing, and water circulation pipes extending from the chambers of the gear casing and upwardly in the tubular casing outside of and free from contact with the slip clutch.

16. In an outboard motor assembly, a drive shaft and a connected propeller shaft, a propeller on the latter shaft, a tubular casing surrounding the drive shaft and a gear casing connected to the lower end thereof having water circulation passages terminating on opposite sides of the propeller to induce a flow of water in the passages, a slip clutch in the tubular casing, and water circulation pipes connected with the passages in the gear casings and extending around the outside of the clutch and enclosed in the tubular casing.

In witness whereof, I have hereunto subscribed my name.

LOUIS J. JOHNSON.